(12) United States Patent
Tambe

(10) Patent No.: US 6,246,218 B1
(45) Date of Patent: Jun. 12, 2001

(54) METHOD AND CONTROL DEVICE FOR STABILIZING A POWER SUPPLY NETWORK

(75) Inventor: Shripad Tambe, Baden (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/409,068

(22) Filed: Sep. 30, 1999

(30) Foreign Application Priority Data

Oct. 5, 1998 (DE) .............................................. 198 45 851

(51) Int. Cl.⁷ ............................................... G05F 1/70
(52) U.S. Cl. ............................................... 323/205; 363/86
(58) Field of Search ................................... 323/205–210; 363/124, 85, 86, 87, 129

(56) References Cited

U.S. PATENT DOCUMENTS

| | | | |
|---|---|---|---|
| 3,955,133 | * 5/1976 | Schroder et al. | 323/50 |
| 3,968,422 | 7/1976 | Waldmann . | |
| 4,068,159 | * 1/1978 | Gyugyi | 323/119 |
| 4,698,581 | * 10/1987 | Shimamura et al. | 323/211 |
| 5,155,740 | 10/1992 | Ao et al. . | |
| 5,412,557 | * 5/1995 | Lauw | 363/37 |
| 5,463,653 | 10/1995 | Du Parc et al. . | |

FOREIGN PATENT DOCUMENTS

| | | |
|---|---|---|
| 3040330A1 | 6/1982 | (DE) . |
| 37 33077 A1 | 4/1989 | (DE) . |
| 19617191A1 | 11/1997 | (DE) . |
| 0 707369 A1 | 4/1996 | (EP) . |

\* cited by examiner

*Primary Examiner*—Peter S. Wong
*Assistant Examiner*—Gary L. Laxton
(74) *Attorney, Agent, or Firm*—Burns, Doane, Swecker & Mathis, L.L.P.

(57) ABSTRACT

In a method for stabilizing a power supply network against fluctuations of the reactive power of an electrical system, in particular of an arc furnace (5), having at least one transformer (3), the at least one transformer (3) is switched on and off on the supply network side in switching sequences which result in a fundamental-frequency power factor with a value at least approximately equal to 1. The fundamental-frequency reactive power is thus at least approximately equal to zero.

12 Claims, 6 Drawing Sheets

METHOD AND CONTROL DEVICE FOR STABILIZING A POWER SUPPLY NETWORK

This application claims priority under 35 U.S.C. §§119 and/or 365 to 19845851.7 filed in Germany on Oct. 5, 1998; the entire content of which is hereby incorporated by reference.

BACKGROUND OF THE INVENTION

1. Field of the Invention

The invention relates to a method for stabilizing a power supply network against fluctuations of the reactive power of an electrical system as claimed in the preamble of patent claim 1, and to a control device of an electrical system as claimed in the preamble of patent claim 6. The electrical system is, in particular, an arc furnace.

2. Discussion of Background

A general problem in power electronics is the product of a wattless component, which produces a reaction on the public power network and interferes with other subscribers to the same network. This is particularly the case when the reactive power varies with time, so that network voltage fluctuations occur which can be seen, for example, as so-called flicker (light fluctuations on luminaries). Such voltage fluctuations occur, for example, in arc furnaces as a result of irregular and uncontrolled changes in the arc.

Widely differing devices are therefore known for stabilizing a power supply network, which attempt to stabilize fluctuations in the reactive load. One conventional method is to vary the triggering angle as a function of the changing load, in order in this way to compensate for the reactive power.

U.S. Pat. No. 5,463,653 describes, for example, such a static VAR compensator (SVC), in which each secondary coil is connected to a thyristor and a freewheeling control loop. The thyristor is triggered with a variable triggering angle in order to obtain a reactive power that is as constant as possible, independently of the changing impedance of the load.

In contrast, U.S. Pat. No. 5,155,740 discloses a flicker compensation device for DC arc furnaces, in which the reactive power is intended to be controlled as a function of a detected reactive power of the arc furnace.

Such compensation devices are complex, and thus relatively expensive.

SUMMARY OF THE INVENTION

It is therefore an object of the invention to provide a novel method and a control device for stabilizing a power supply network against fluctuations in the reactive power of an electrical system, in order to prevent such interference reactions on the network, with little complexity.

This object is achieved by a method having the features of patent claim 1, and by a control device having the features of patent claim 6.

A further object of the invention is to reduce the size of the transformer, and thus the costs for its production. This object is achieved by an apparatus having the features of patent claim 8.

In the method according to the invention, switching sequences are used which allow the fundamental-frequency power factor to be kept at least approximately equal to one at all times, as a function of the network current. This means that the fundamental-frequency reactive power is thus always at least approximately zero and fluctuations have scarcely any effect on the network.

A network current is in this case switched on and off at least approximately symmetrically with respect to its extreme values. Voltage segments which each extend as far as an extreme value of the network voltage are applied to primary windings of a transformer. In this case, each voltage segment of a positive or negative cycle is repeated in the next cycle with the opposite mathematical sign.

In a preferred variant of the method, a three-phase system is used, in which the voltage segments are applied to the at least one primary winding, phase-shifted through 120° with respect to one another. An addition of all the voltage segments preferably results in 100% of all the voltage values of one phase.

In a further preferred variant of the method, the voltage segments which are applied via the primary windings are pulse-width modulated. This prevents relative harmonics, which would otherwise cause negative reactions on the supply network and to sensitive equipment connected to it.

In one preferred embodiment of the control device according to the invention for carrying out the method, the primary windings are composed of three primary coils or coil systems, each of which can be connected to in each case one phase of the supply network. Each coil or each coil system is preferably connected to a freewheeling control loop.

In another preferred embodiment, only one primary coil or one primary coil system is provided, which has three phases applied to it, with each phase input being provided with a switch element. Furthermore, means are provided to prevent interference with the individual phases. Such a means is, for example, a network commutator.

In one preferred embodiment of the invention, all the primary windings are connected to the same secondary windings. These secondary windings may in this case comprise a single coil or a coil system. This allows the size of the furnace transformer to be reduced, as a result of which its production costs can be greatly reduced.

It is furthermore advantageous that the method according to the invention can be used for both DC and AC arc furnaces.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
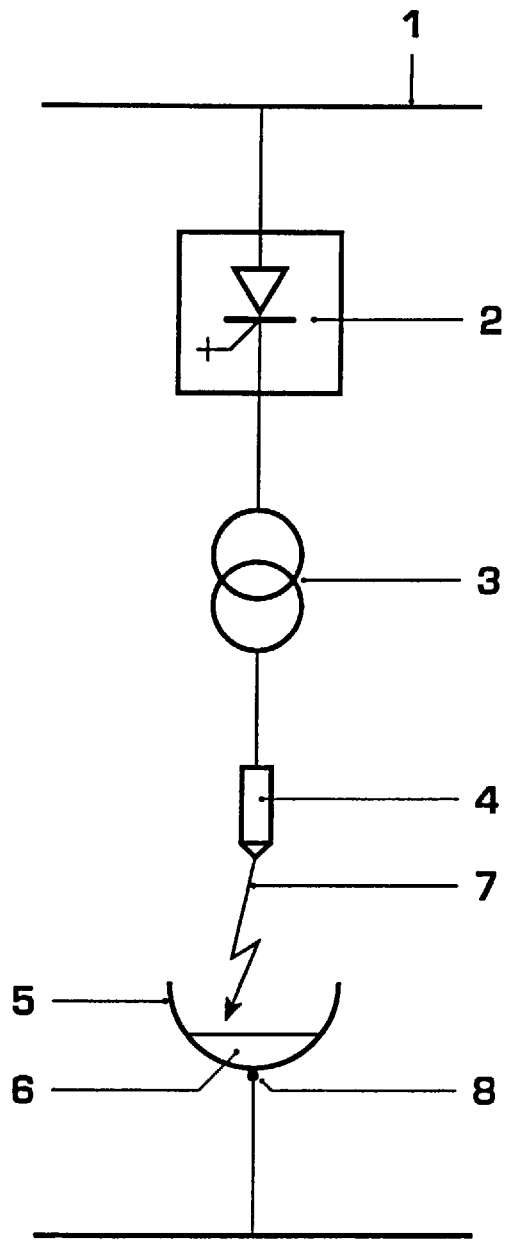
FIG. 1a shows a schematic illustration of an AC arc furnace which is connected to a supply network and has the control device according to the invention.
Figure 1B:
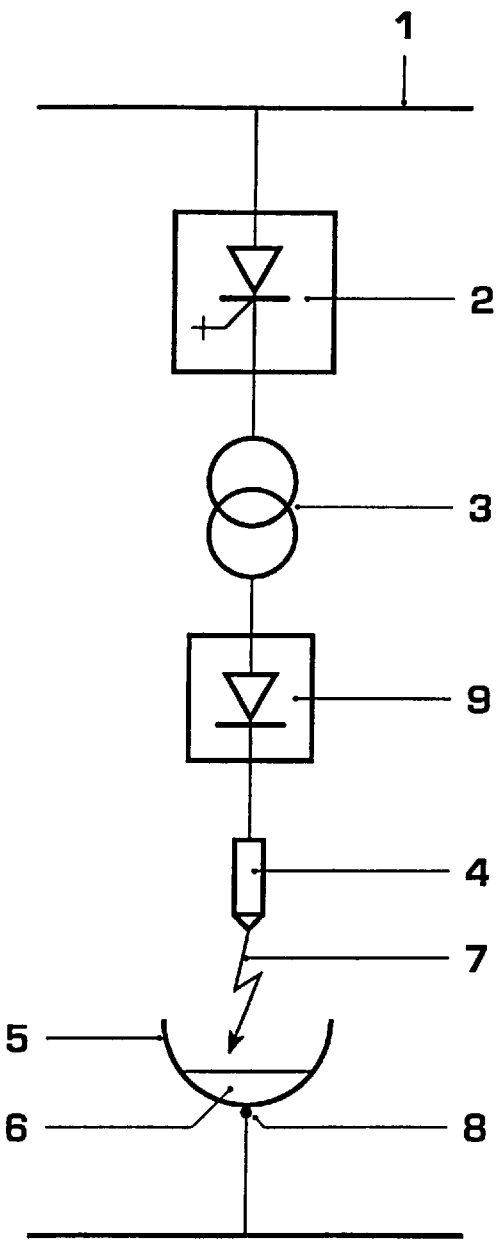
FIG. 1b shows a schematic illustration of a DC arc furnace having the control device according to the invention.

Referring now to the drawings, wherein like reference numerals designate identical or corresponding parts throughout the several views, FIGS. 1a and 1b show an arc furnace 5 having at least one first electrode 4, which is connected via a furnace transformer 3 and a switch device 2 to an AC network 1. A second electrode 8 is located in the bottom region of the arc furnace 5. The arc furnace 5 can be fed with a material 6 to be melted. Where the arc furnace is operating, an arc 7 burns between a lower end of the first electrode 4 and the surface of the material 6 to be melted. The arc furnace shown in FIG. 1a is operated with alternating current, while that in FIG. 1b is operated with direct current. As can be seen from 1b, in the case of the DC arc furnace, a rectifier 9 is arranged between the furnace transformer 3 and the first electrode 4, in order to convert the AC signal into a DC signal.

Figure 2:
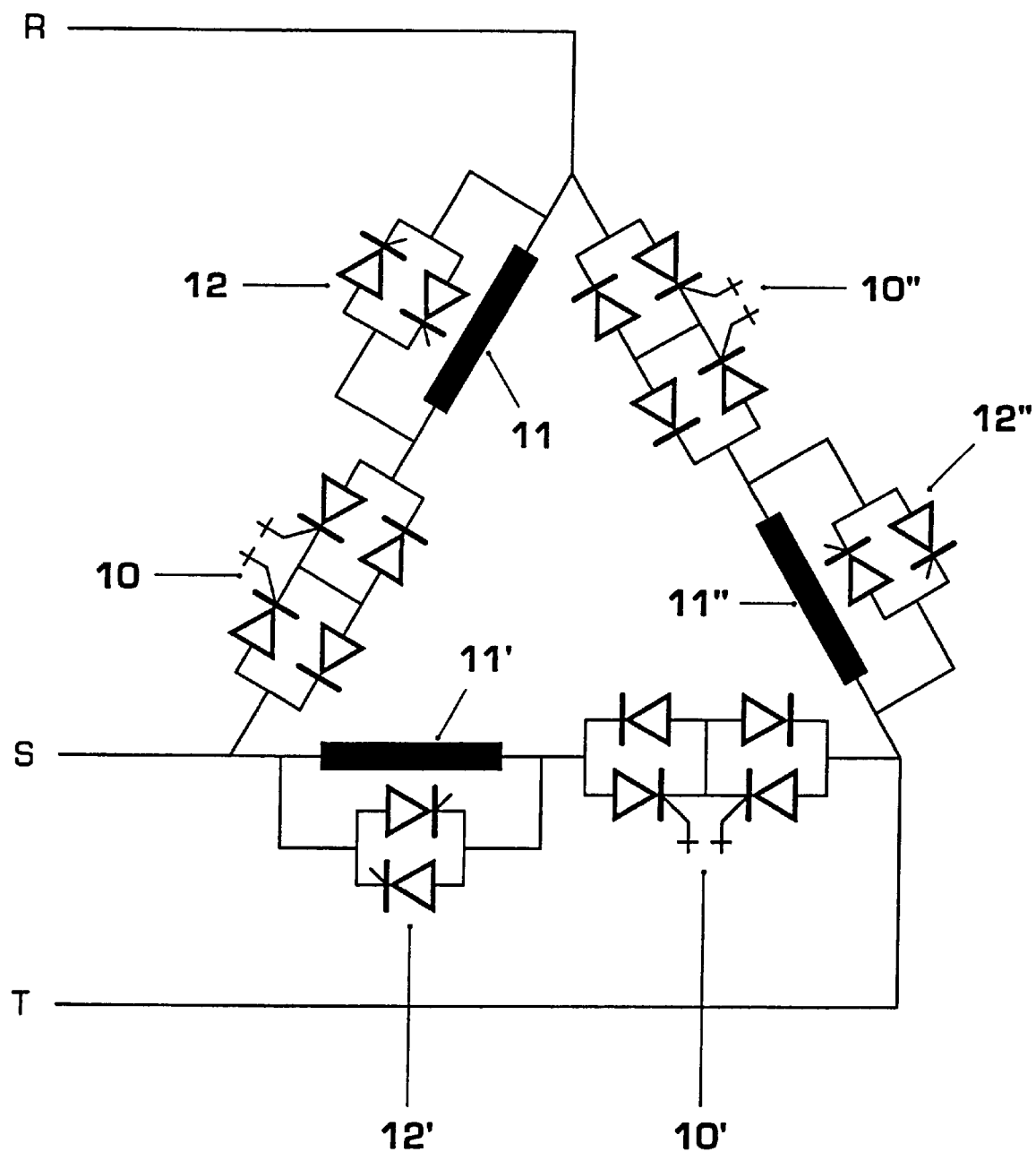
FIG. 2 shows a part of the control device on the supply network side, according to a first embodiment of the invention.

FIG. 2 shows a first embodiment of the control device according to the invention, in which a part of the switch device which is essential to the invention as well as a primary stage of the furnace transformer can be seen. A three-armed, closed control loop is provided with three phase inputs R, Y, B. First primary windings 11 are arranged between a first phase input R and a second phase input Y, and a first switch element 10 is arranged in series following them. A first freewheeling control loop 12 is arranged in parallel with the first primary windings 11. The same elements are also located between the second phase input Y and the third phase input B, as well as between the third and the first phase inputs; that is to say second and third primary windings 11', 11", second and third switch elements 10', 10", and second and third freewheeling control loops 12', 12".

In this example, the primary windings 11,11',11" are coils, such as those normally used in transformers, but in this case it is also possible to use a coil system comprising a plurality of coils. The freewheeling control loops 12, 12', 12" are in this example each formed from two freewheeling diodes, but other conventionally used means may also be employed. The switch elements 10, 10', 10" are fast bi-directional switches, that is to say conventional thyristors having relatively short switching times. Suitable switch elements are, for example, a GTO (Gate Turn Off-Thyristor), IGCT (Integrated Gate Commutated Thyristor), IGBT (Insulated Gate Bipolar Transistor) or elements having switching times which are comparable to or shorter than said elements. Elements having the same characteristic data are preferably used for each arm of the control loop, so that the three arms are of identical construction.

Figure 3A:
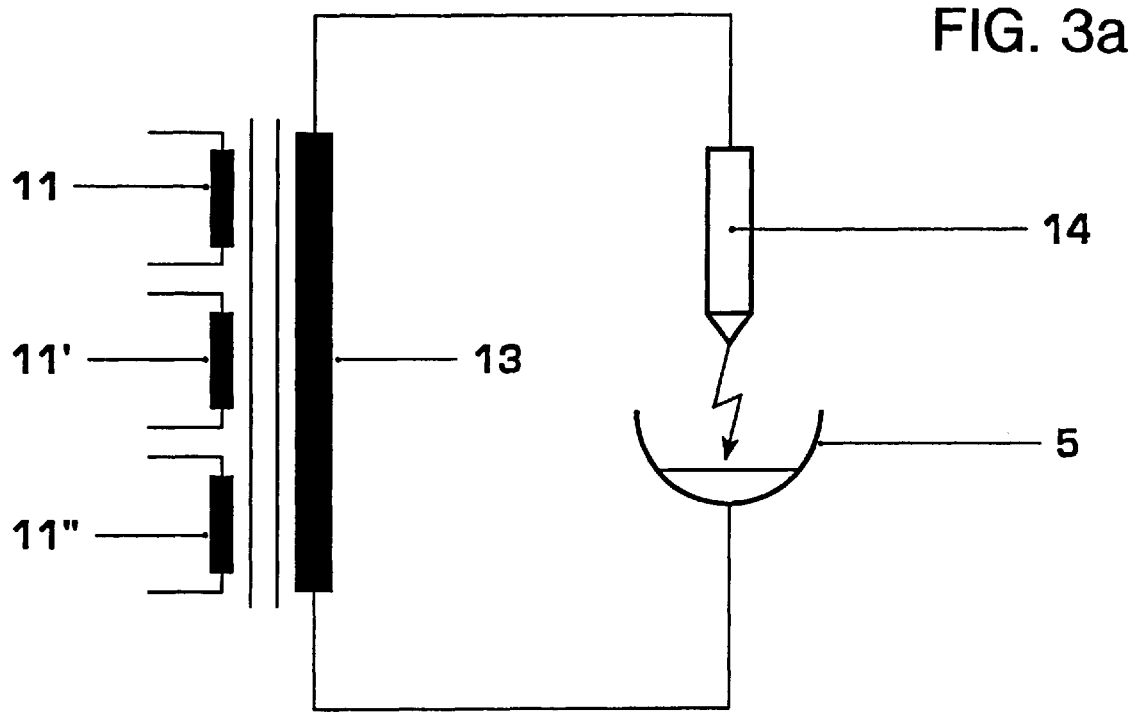
FIG. 3a shows a schematic illustration of the primary and secondary windings of the transformer of a first variant of the circuit shown in FIG. 2, which is connected to a AC load.
Figure 3B:
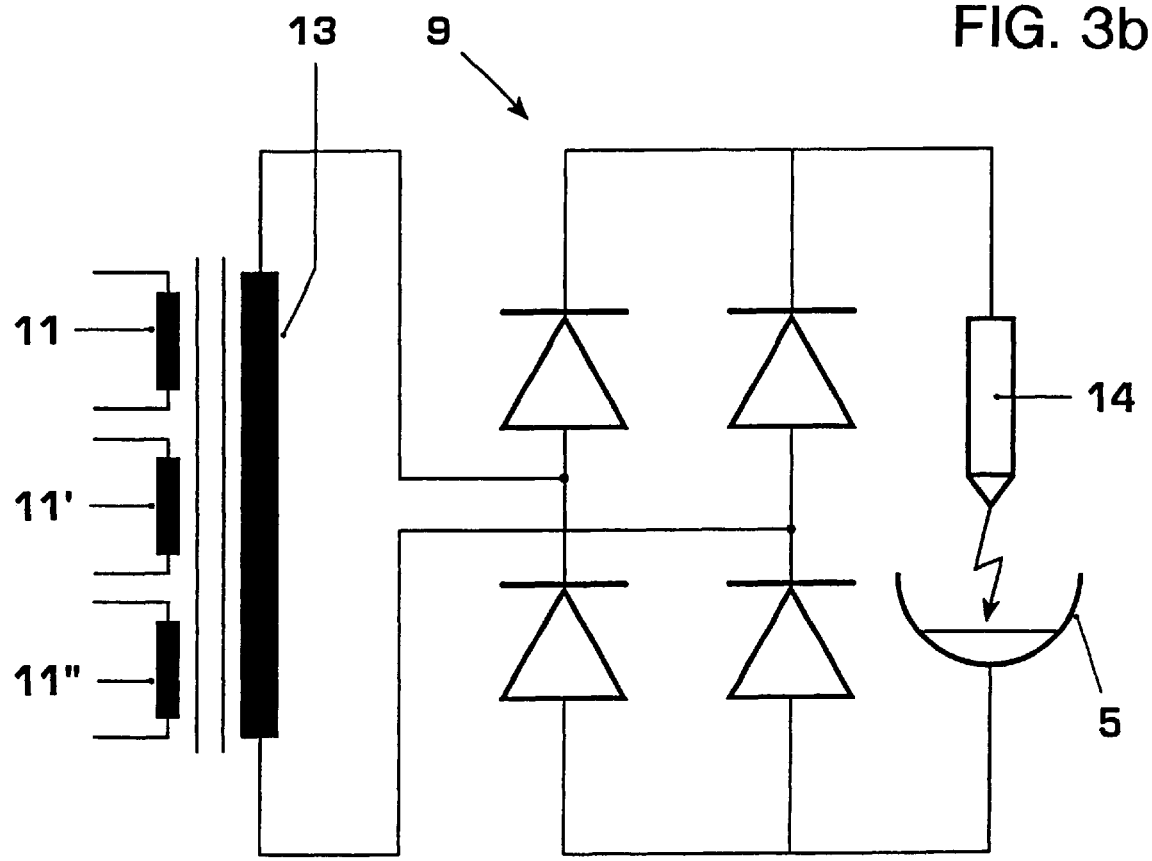
FIG. 3b shows a schematic illustration of the primary and secondary windings of the transformer of a second variant of the circuit shown in FIG. 2, which is connected to a DC load.

As can be seen from FIGS. 3a and 3b, all three primary windings 11, 11', 11" are operatively connected to the same secondary windings 13. The secondary windings 13, like the primary windings 11, also comprise a coil or are composed of a coil system. In the case of an AC arc furnace with an AC load, the secondary winding 13 can be connected directly to the first electrode 4, as is shown in FIG. 3a. In the case of a DC arc furnace, see FIG. 3b, a rectifier 9 is connected between the secondary winding 13 and the first electrode 4.

The method according to the invention will be explained why in the following text with reference to the embodiment illustrated in FIGS. 1–3:

A three-phase sinusoidal input signal is switched on and off by means of the fast switch elements 10, 10', 10" in switching sequences which always result in a fundamental-frequency power factor having a value of at least approximately 1. For this purpose, a sinusoidal input voltage is subdivided into voltage segments, which are applied to the primary windings 10, 10', 10".

Figure 4A:
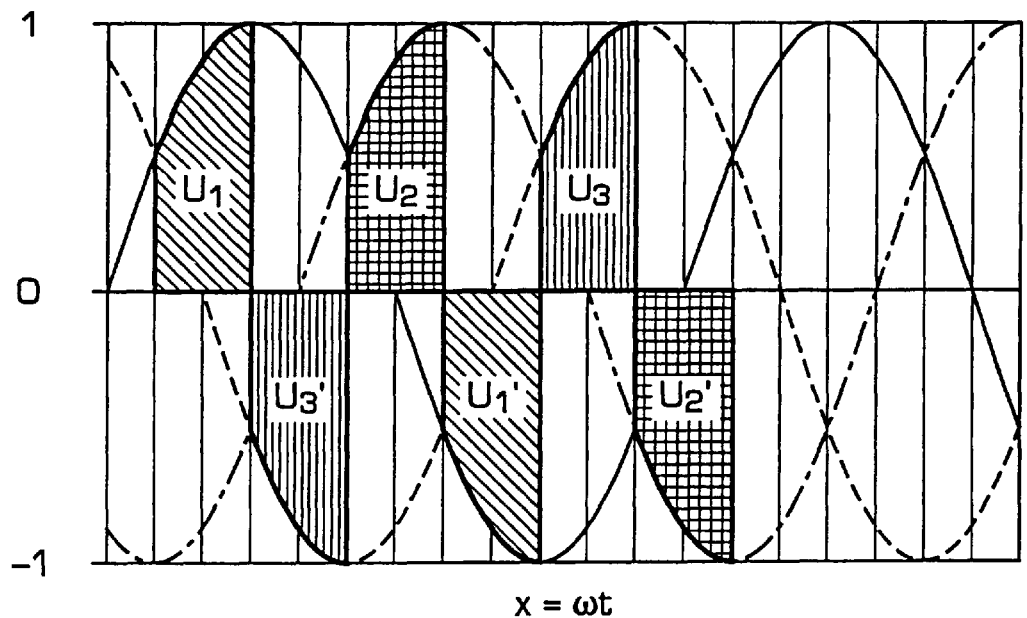
FIG. 4a shows a graphical illustration of the voltage across the primary windings.

FIG. 4a shows the voltage values applied via the primary windings 10, 10', 10", as a function of time. The sinusoidal curves show the three-phase input signal, and the shaded areas show the voltage segments applied via the three primary windings 10, 10', 10". A first positive voltage segment U1, which is applied via the first primary windings 10, rises from a minimum value to a maximum value which corresponds to an extreme value of the input or network voltage. This first positive voltage segment U1 has its identical pendant, in the negative cycle part, in a second negative voltage segment U1'. Second and third positive and negative voltage segments U2, U2' and U3, U3' are likewise present, which are applied via the second and third primary windings 10', 10", respectively.

As is described here, the voltage value of one segment has fallen at least approximately to zero before the following segment starts. Addition of all the voltage segments in this case results at least approximately in 100% of a single-phase input signal.

Figure 4B:
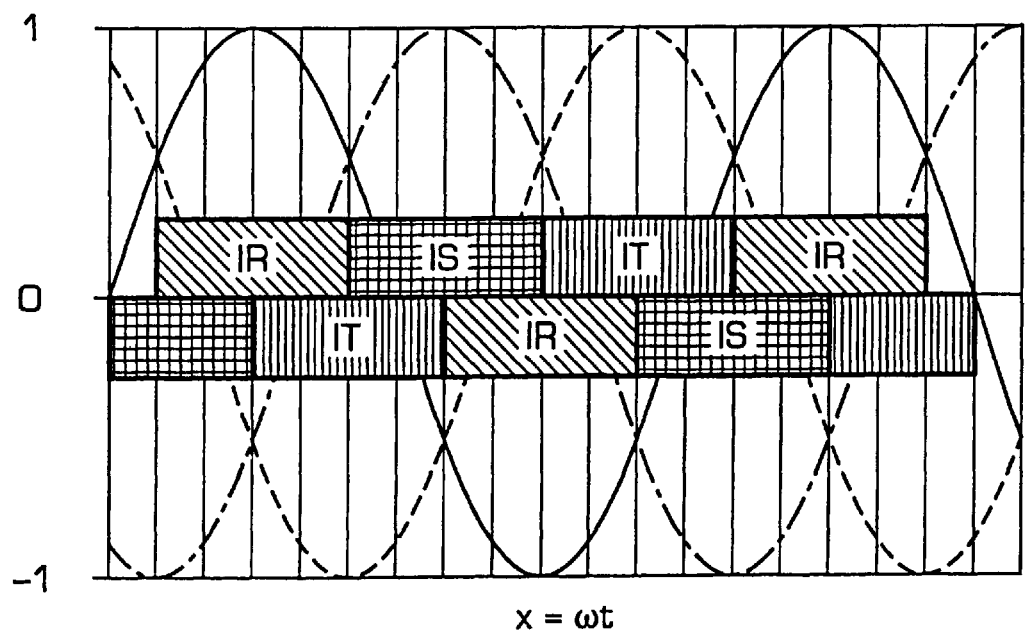
FIG. 4b shows a graphical illustration of the network current.

FIG. 4b shows the associated network current values as a function of time. The sinusoidal curve in this case corresponds to the unswitched current signal on the input side, the square-wave curve with the shaded areas correspond to the network current associated with the respective voltage segments for the individual phases. IR thus denotes the network current in the first phase, IY that in the second phase, and IB that in the third phase. As can be seen from FIGS. 4a and 4b, the sinusoidal network current is switched on and off symmetrically with respect to its extreme values. In consequence, the fundamental-frequency network currents IR, IY and IB are in phase with the effective voltage, so that the fundamental-frequency power factor is equal to 1. The freewheeling circuits 12, 12', 12" shown in FIG. 2 in this case prevent excessively high voltages occurring during the switching-off process.

Figure 5A:
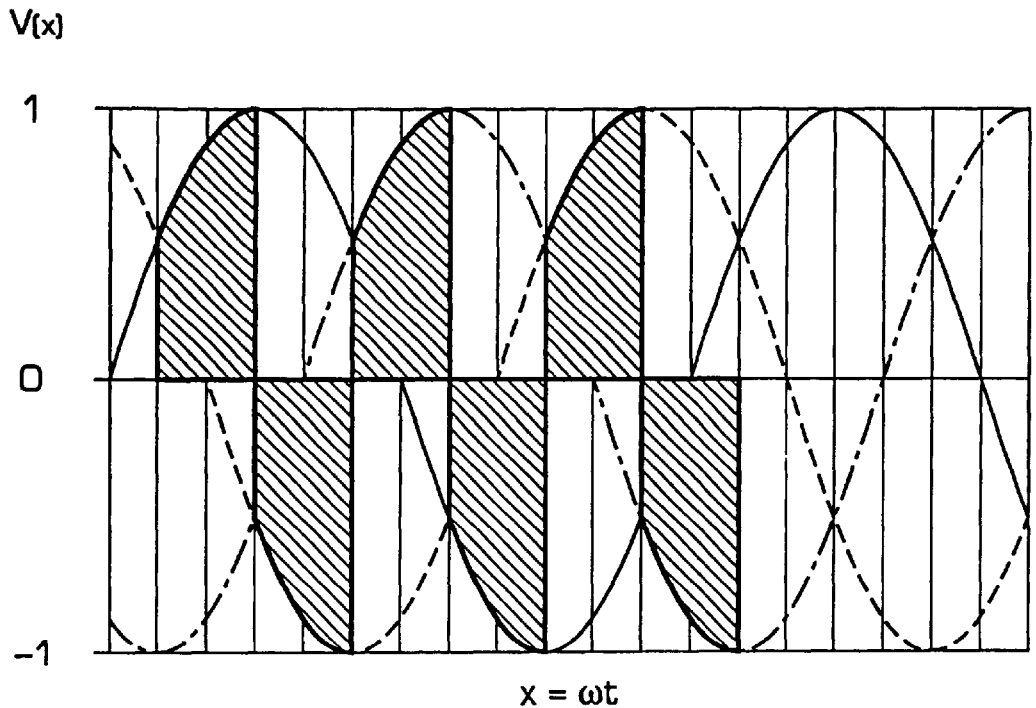
FIG. 5a shows a graphical illustration of the output voltage across the secondary winding.
Figure 5B:
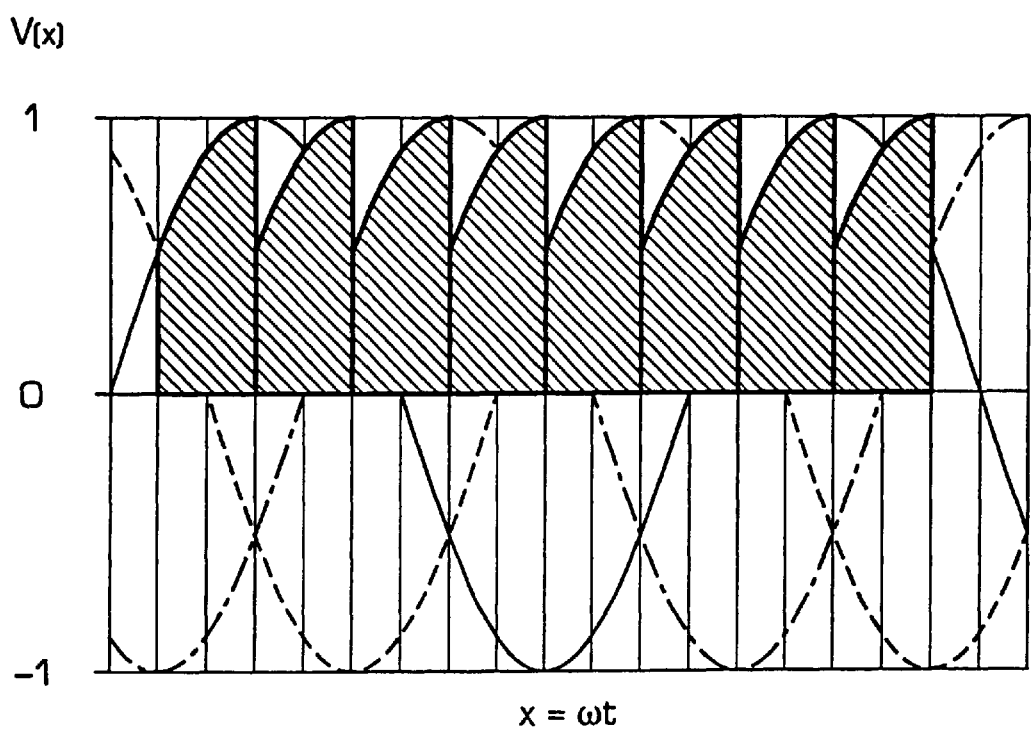
FIG. 5b shows a graphical illustration of the output voltage downstream from a rectifier.
Figure 5C:
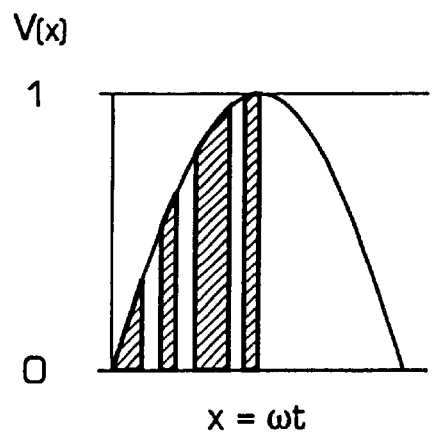
FIG. 5c shows pulse-width modulation of an applied voltage segment.

FIG. 5a shows the voltage values present across the secondary winding. These correspond essentially to the voltage segments applied to the primary windings. FIG. 5b shows the voltage downstream of the rectifier 9. If the addition of the voltage segments across the secondary winding does not amount to 100% of the input signal, then the voltage segments applied via the primary winding are subjected to pulse-width modulation, in order to change the power factor at least approximately to 1. This is shown in FIG. 5c. In one preferred variant of the method, pulse-width modulation is in principle carried out in order to prevent harmonics, or at least to reduce them.

Figure 6:
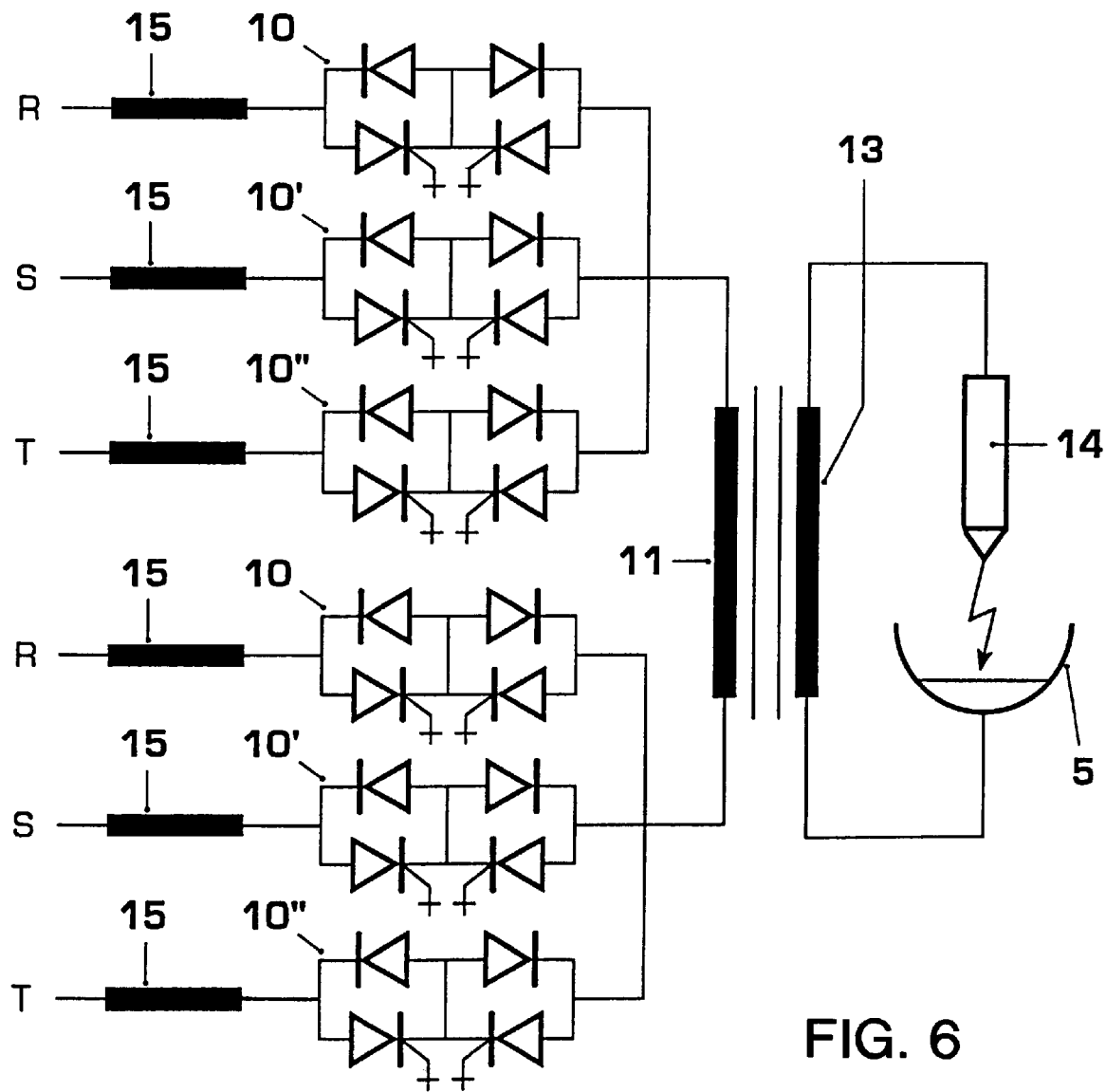
FIG. 6 shows a part of the control device on the supply network side, according to a second embodiment of the invention.

FIG. 6 shows a second embodiment of a control device according to the invention for an arc furnace:

Instead of three separate primary winding systems, there is only one primary winding system 11, which is operatively connected to the secondary windings 13. The primary winding system 11 is connected on both sides to in each case three parallel-connected switch elements 10, 10', 10", which are respectively associated with one phase input or phase output R, Y, B. At least one network commutator is in case arranged between the switch elements 10, 10', 10" and the phase input or output, which network commutator prevents commutation and thus interference interactions with the individual phases. This control unit and/or the transformer are/is once again switched on and off with the switching sequences described above and as shown in FIGS. 3a and 3b, so that a voltage as shown in FIG. 5 is once again present across the secondary windings.

Obviously, numerous modifications and variations of the present invention are possible in light of the above teachings. It is therefore to be understood that, within the scope of the appended claims, the invention may be practiced otherwise than as specifically described herein.

What is claimed is:

1. A method for stabilizing a power supply network against fluctuations of the reactive power of an electrical system, having at least one transformer, wherein the at least one transformer is switched on and off on the supply network side in switching sequences which result in a fundamental-frequency power factor with a value approximately equal to 1, wherein at least one switch element for performing the switching and the at least one transformer are connected in series between the power supply network and the electrical system.

2. The method as claimed in claim 1, wherein voltage segments of an input voltage are applied via at least one primary winding of the at least one transformer wherein the voltage segments, which are applied via the at least one primary winding, are phase-shifted through 120° with respect to one another, wherein the voltage value of one segment falls to approximately zero before the following segment starts.

3. The method as claimed in claim 1 wherein the voltage segments are pulse-width modulated.

4. A control device of an arc furnace, the control device comprising at least one transformer with at least one primary winding and at least one secondary winding, wherein at least one switch element is arranged on the supply network side and is operatively connected to the at least one primary winding, wherein the switch element can be switched off in switching sequences, wherein the switching sequences lead to a fundamental-frequency power factor having approximately the value 1, and wherein the at least one transformer and the at least one switch element are connected in series between the supply network and the arc furnace.

5. The control device as claimed in claim 4, wherein the at least one switch element is a GTO (Gate Turn Off Thyristor), or an IGCT (Integrated Gate Commutated Thyristor), or an IGBT (Insulated Gate Bipolar Transistor).

6. The control device as claimed in claim 4, wherein the transformer has three primary windings and one secondary winding, and the three primary windings are operatively connected to the secondary winding.

7. The control device as claimed in claim 4, wherein the at least one primary winding comprises three primary windings and the control device further comprises three switch elements respectively associated with the three primary windings, the three primary windings and the associated switch elements forming a closed three-armed control loop, wherein each primary winding and the associated switch element can be connected to one phase of a three-phase network supply.

8. The control device as claimed in claim 4, wherein the at least one primary winding is a single primary winding, which can be connected to a three-phase network supply, and wherein the primary winding is operatively connected on the network supply side to at least three switch elements and each of the at least three switch elements can be connected to one phase of the network supply.

9. The method of claim 1, wherein the at least one transformer is switched on and off on the supply network side in switching sequences which result in a fundamental-frequency power factor with a value equal to 1.

10. The method of claim 2, wherein the voltage value of one segment falls to zero before the following segment starts.

11. The control device of claim 4, wherein the switching sequences lead to a fundamental-frequency power factor having the value 1.

12. The method of claim 1, electrical system is an arc furnace.

* * * * *